United States Patent
Köbe et al.

(10) Patent No.: US 7,203,612 B2
(45) Date of Patent: Apr. 10, 2007

(54) METHOD FOR DETERMINING INTERNAL PRESSURE OF A VEHICLE TIRE

(75) Inventors: Andreas Köbe, Bensheim (DE); Holger Behrends, Hannover (DE); Lennert Gootjes, Hannover (DE); Joachim Kohn, Hannover (DE); Ines Runge, Hannover (DE); Stefan Kluge, Garbsen (DE); Alfred Duchow, Hohenhameln (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/563,978

(22) PCT Filed: Jul. 8, 2004

(86) PCT No.: PCT/EP2004/051403

§ 371 (c)(1),
(2), (4) Date: Jul. 3, 2006

(87) PCT Pub. No.: WO2005/005174

PCT Pub. Date: Jan. 20, 2005

(65) Prior Publication Data

US 2006/0276984 A1    Dec. 7, 2006

(30) Foreign Application Priority Data

Jul. 8, 2003 (DE) ............................... 103 31 585

(51) Int. Cl.
 *G06F 19/00* (2006.01)

(52) U.S. Cl. ............................................. 702/75; 701/2

(58) Field of Classification Search ................ 702/75, 702/182–185, 2, 24, 29, 33
See application file for complete search history.

(56) References Cited

U.S. PATENT DOCUMENTS

| | | | |
|---|---|---|---|
| 5,553,491 A | 9/1996 | Naito et al. | |
| 5,826,207 A * | 10/1998 | Ohashi et al. | ................ 701/36 |
| 6,385,553 B1 | 5/2002 | Naito et al. | |
| 6,450,020 B1 | 9/2002 | Naito et al. | |
| 2003/0172728 A1* | 9/2003 | Gustafsson et al. | ........... 73/146 |
| 2005/0000278 A1* | 1/2005 | Haralampu et al. | ........... 73/146 |

FOREIGN PATENT DOCUMENTS

| | | |
|---|---|---|
| DE | 4009540 | 9/1991 |
| DE | 10157885 | 10/2002 |
| EP | 0699546 | 3/1996 |
| EP | 0891904 | 1/1999 |
| JP | 5-133 831 | 5/1993 |
| JP | 8-219 920 | 8/1996 |

* cited by examiner

Primary Examiner—Edward Raymond (57) ABSTRACT

Disclosed are different processes for the determination of the internal pressure, particularly of the minimum pressure of the tire of a motor vehicle during driving operation, through an analysis of the characteristic vibration behavior of the wheel, whereby the standardized amplitude is determined from the vibration spectrum determined and the resonance frequency is observed.

23 Claims, 5 Drawing Sheets

METHOD FOR DETERMINING INTERNAL PRESSURE OF A VEHICLE TIRE

BACKGROUND OF THE INVENTION

The invention relates to a process for the determination of internal pressure, particularly of the minimum pressure of the tire of a motor vehicle during driving operation, through an analysis of the characteristic vibration behavior of the wheel, whereby the standardized amplitude is determined from the vibration spectrum detected and the amplitude maxima of the resonance frequency are observed.

One such process is known, for example, from the patent document U.S. Pat. No. 6,450,020 B1. The German patent document DE 101 57 858 A1 discloses a process for determining the air pressure of the tire from the vehicle operation at low and high speeds, which is prepared independently by various elements attached to the vehicle. This process is based on a resonance frequency extracted on the basis of a wheel speed signal issued by a speed sensor assigned to every wheel. The determination of the air pressure of the tire is, furthermore, based on a dynamic load radius derived from the wheel speed signal.

The intensity and frequency situation of the tire vibrations that arise during travel are highly dependent upon the internal pressure of the tire, which determines both the rigidity as well as the damping of the wheel. These characteristics also determine the intensity and frequency with which the rim is stimulated to rotational vibrations. The rotational vibrations of the wheel can also be measured with an ABS rotational speed sensor, for example.

The rotational vibrations appear most clearly at the resonance frequencies that are dependent on the internal pressure.

In order to operate a motor vehicle as economically as possible, and in order to achieve a high level of consistency, the tires must be filled with a preset air pressure. The air pressure drops rapidly because of losses of diffusion and density in the tires. The leakage rates that arise are unavoidable, and typically lie within the range of a few 100 mbar per year. The air pressure of the tire must therefore be monitored regularly. The average driver, however, tends to either give the tire pressure no attention, or at least not the appropriate level of attention. For this reason, motor vehicles are increasingly equipped with tire pressure monitoring systems that continuously monitor the air pressure in the tires and issue a warning to the driver if the tire pressure drops below a preset minimum pressure.

Direct measuring systems are known in which a sensor that measures the pressure is located within the pressure space of the vehicle wheel. The measuring system reading out the internal pressure of the tire that is determined is, as a general rule, supplied with power by a battery and transmits its measuring data over a spark gap. The disadvantage of this system is, in addition to the operability, which is dependent on the service life of the battery, also the unbalanced dimension on the rim, ranging up to 20 g, that comes about from the sensor and the power supply.

Indirectly measuring systems make use of the change in the degree of the rolling of a wheel that occurs upon changes in the air pressure in the tires. The change in the extent of rolling is determined by means of the ABS sensors that monitor all of the wheels of a vehicle simultaneously and evaluate the corresponding data. These systems have the fundamental disadvantage that a nearly identical pressure loss in all tires, such as necessarily occurs from leakage losses, can not be detected.

The Japanese patent document JP 5-133 831 discloses a device for determining the internal pressure of a vehicle tire. In this device, the resonance frequency of the tire is determined by a frequency analysis that is carried out in relation to a speed signal of the wheel, including the vibration frequency of the tire. The current pressure is determined from the resonance frequency detected. The resonance frequency used for the determination of the air pressure varies within the range of 30–50 Hz. This range is adequate if the vehicle is in a lower or medium speed range. If the speed of the vehicle increases, then the vibration behavior of a tire is difficult to evaluate. As the result, the spectrum of the resonance frequency drops, and thereby impairs its significance in regard to the internal tire pressure.

A device by means of which several resonance frequencies from several frequency ranges, such as a range from 30 to 50 Hz and a range from 60 to 90 Hz, for example, are determined, is described in JP 8-219 920.

The knowledge that the wheel speed signal of a wheel being driven contains a resonance frequency of a high order, which then changes very greatly upon a change in the internal pressure of the tire if the speed of the vehicle is high, forms the basis for the process in accordance with U.S. Pat. No. 6,385,553. In this publication, it is described in very detailed form how the frequency spectrum and the resonance frequency that are of interest are determined by mathematical means, such as by a Fourier transformation (FFT), for example, so that a standardized amplitude can be plotted over the frequency.

SUMMARY OF THE INVENTION

The task which forms the basis for the invention is that of specifying a process by means of which the resonance frequency, such as determined in accordance with U.S. Pat. No. 6,385,553, for example, can be assessed in order to determine whether the internal tire pressure of any given wheel of the vehicle drops below a preset value, in order to give the driver a corresponding warning signal.

A first assessment process is characterized by the following steps:

a) Determination and recording of the resonance frequency of the wheel with a preset theoretical pressure;

b) Determination and storing in memory of the gradients $\alpha_{1Theoretical}$, $\alpha_{2Theoretical}$ of the frequency curve above and below the resonance;

c) Formation of the ratio $\alpha_{Theoretical}$ from the gradients $\alpha_{1Theoretical}$ and $\alpha_{2Theoretical}$;

d) Continuous determination of the resonance frequency of the wheel in the driving operation;

e) Continuous determination of the gradients $\alpha_{1Actual}$, $\alpha_{2Actual}$ of the frequency curve above and below the resonance;

f) Formation of the ratio $\alpha_{Actual}$ from the gradients $\alpha_{1Actual}$, $\alpha_{2Actual}$;

g) Continuous comparison of the ratios $\alpha_{Actual}$ and $\alpha_{Theoretical}$ with each other;

h) Production of a signal if the divergence from $\alpha_{Actual}$ to $\alpha_{Theoretical}$ exceeds a defined value.

In the assessment of the vibration characteristics, the ratio of the slopes to the left and to the right of the maximum is determined. The frequency range preferably lies between 20–60 Hz and 70–110 Hz. The ratio of the slopes lies in the range from −0.25 to −4.

An additional process in accordance with the invention is characterized by the following steps:

a) Determination and recording of the resonance frequency of the wheel with a preset theoretical pressure;
b) Determining the xdB-, particularly the 3 dB cut-off frequency $f_{G1Theoretical}$, $f_{G2Theoretical}$ of the maxima; p0 c) Forming and storing in memory of the difference frequency $f_{GTheoretical}$ from the higher xdB cut-off frequency $f_{G2Theoretical}$ and the lower xdB cut-off frequency $f_{G1Theoretical}$;
d) Continuous determination of the resonance frequency of the wheel during the driving operation;
e) Continuous determination of the xdB-, particularly the 3 dB cut-off frequencies $f_{G1Actual}$, $f_{G2Actual}$ of the maxima during the driving operation;
f) Formation of the difference frequency $f_{GActual}$ from the higher xdB cut-off frequency $f_{G2Actual}$ and the lower xdB cut-off frequency $f_{G1Actual}$;
g) Continuous comparison of the difference frequencies $f_{GTheoretical}$ and $f_{GActual}$ with each other;
h) Production of a signal if the divergence from $f_{GActual}$ to $f_{GTheoretical}$ exceeds a defined value.

This process makes use of the phenomenon that the xdB cut-off frequencies of the maxima drift in the direction of higher frequencies upon rising air pressure. The current air pressure of the tire can then be determined from the dependence. This process can also be carried out for every wheel individually, whereby a correlation of the wheels with one another is not necessary.

A third assessment process in accordance with the invention is characterized by the following steps:
a) Determination and recording of the resonance frequency of the wheel with a preset theoretical pressure;
b) Determination and storing in memory of the maximum amplitude value $a_{Theoretical}$ at the theoretical pressure of the tire;
c) Continuous determination of the resonance frequency of the wheel in the driving operation;
d) Continuous determination of the maximum amplitude value $a_{Actual}$;
e) Continuous comparison of the maximum amplitude value $a_{Theoretical}$ and $a_{Actual}$ with each other;
f) Production of a signal if the divergence from $a_{Actual}$ to $a_{Theoretical}$ exceeds a defined value.

The standardized amplitude for the determination of the air pressure is also used for this process.

A fourth process in accordance with this category is characterized by the following steps in accordance with the invention:
a) Determination and recording of the frequency spectrum of the wheel with a preset theoretical pressure and determination of the approximate position of the resonance frequency;
b) Transformation of the differential equations describing the vibration behavior of the wheel:
  - by means of Laplace- or Fourier transformation;
c) Selection of a range $f_{Theoretical}$ around the approximate position of the resonance frequency $f_{Theoretical}$;
d) Correlation of the selected range $f_{Theoretical}$ with the transformed differential equations;
e) Computation of the rotational rigidity $c_{s,\ Theoretical}$ and of the rotational damping $d_{s,\ Theoretical}$;
f) Continuous determination of the frequency spectrum of the wheel in the driving operation and determination of the approximate position of the resonance frequency $f_{Actual}$;
g) Selection of a range $f_{Actual}$ around the approximate position of the resonance frequency $f_{Actual}$;
h) Correlation of the selected range $f_{Actual}$ of the resonance frequency determined $f_{Actual}$ with the transformed differential equations for the determination of the rotational rigidity $c_{s,\ Actual}$ and of the rotational damping $d_{s,\ Actual}$;
i) Formation of the difference of $c_{s,\ Theoretical}$ and $c_{s,\ Actual}$, and of the difference from $d_{s,\ Theoretical}$ and $d_{s,\ Actual}$ and the production of a signal, if at least one of the differences exceeds a defined value.

For the use of the four models forming the basis for the process, suitable values must be determined in advance for the inertia of the tires $J_F$ and the rim $J_R$, as well as for the tire radius r, which represent the tires and rims that are typical for the specific vehicle.

As a supplement to process four, the tire pressure can, in a fifth process in accordance with the category, also be determined directly from the parameters $p(c_s, d_s)$. This is characterized by the following steps in accordance with the invention which go beyond process four:

a) Determination of the internal tire pressure $p_{Theoretical}$ ($c_{s,\ Theoretical}$, $d_{s,\ Theoretical}$) in the theoretical condition in dependence on the rotational rigidity $c_s$ and the rotational damping $d_s$, whereby parameters that take into account the tires that are typical for the specific vehicle are referred to in this connection;
b) Determination of the internal tire pressure $p_{Actual}$ ($c_{s,\ Actual}$, $d_{s,\ Actual}$) in the actual condition in dependence on the rotational rigidity $c_s$ and the rotational damping $d_s$, whereby parameters are referred to in this connection that take into account the tires that are typical for the specific vehicle;
c) Formation of the difference from $p_{Theoretical}$ and $p_{Actual}$ and production of a signal if the difference exceeds a defined value.

Information that is generated in the tire/wheel suspension system is filtered out from the signals of the wheel rotational speed transmitter by means of these processes (4 and 5). The information that is assessed relates to the rotational vibrations of the tire. The range of 20–60 Hz is preferably selected from the resonance frequency.

Instead of the production of a warning signal, it is also possible, in accordance with process 5, to compute and to display the air pressure of the tire. The natural frequency of the rotary oscillation of the rim is thereby determined from the rim speed, and the air-pressure inside the pneumatic tire is computed by means of the natural frequency of the rotary oscillation of the rim. It is thereby possible to dispense with sensors for the determination of the vertical movement of the wheel and to determine the air pressure inside the pneumatic tire alone by means of the rotational movement of the tire or rim, as the case may be. The natural frequency of the rotary oscillation of the rim is dependent on pressure, so that the air pressure inside the pneumatic tire can be computed through the determination of the natural frequency.

The computation of the air pressure of the tire is advantageously carried out by means of a comparison of the natural frequency determined with comparative values recorded in advance. These comparative values of the natural frequency were measured at different rim speeds or driving speeds, respectively, and stored in a memory storage unit. A curve of natural frequencies, which can be assigned to a corresponding air pressure of the tire, consequently results from the speed value. If the computed natural frequency of the rotary oscillation of the rim is not in agreement with the comparative value, then a divergence of the air pressure, which can be computed by qualitative and quantitative means, is present.

The rim speed is suitably recorded by means of an ABS sensor that is already present, so that no additional sensor has to be provided and no additional constructional expense has to be borne in order to obtain the input quantity. The computation itself is carried out in an evaluation unit, particularly in a computer.

The computation of the air pressure of the tire is advantageously carried out under consideration of the operating parameters of the tire, particularly the temperature of the tire, because this has an influence on the natural frequency of the rotary oscillation, since the rigidity and the damping of the pneumatic tire are changed by the temperature of the tire, which points, in turn, are parameters the changing of which influence the natural frequency.

In order to be able to compute the natural frequency of the rotary oscillation of the rim, a single-tire model is used which takes into consideration the tire parameter determined in advance and, in particular, the rotational rigidity and the rotational damping of the tire, as well as the inertia of the tire and of the rim, are input as fixed quantities of the tire or of the rim, as the case may be. During a change of a tire or rim, as the case may be, correspondingly changed parameters or characteristic values must be input and new comparative values must be determined. During a change of a tire or rim, as the case may be, the system must be calibrated again with new tire parameters for tires of a different dimension or design type.

In all five processes, the signal is preferably only produced if the divergence falls short of the defined value over a determined period of time, such as one minute, for example.

The gradients $1_{Theoretical}$ and $2_{Theoretical}$ below and above the resonance are, at theoretical pressure, preferably determined externally for one specific type of tire and are stored in memory on a memory storage medium that can be connected with the tires.

The xdB- and, in particular, the 3 dB cut-off frequencies $f_{G1Theoretical}$, $f_{G2Theoretical}$ of the maxima are preferably determined externally for one specific type of tire, and are stored in memory in a memory storage medium that can be connected with the tire.

The maximum amplitude values $a_{Theoretical}$ at theoretical pressure are also preferably determined externally for one specific type of tire, and are stored in memory in a memory storage medium that can be connected with the tire.

The first correlation of the transformed differential equations with the transformed natural frequency curve for the determination of the internal tire pressure $p_{Theoretical}$ or the rotational rigidity $c_s$, respectively, and the rotational damping $d_s$, is preferably determined externally for one specific type of tire and stored in memory in a memory storage medium that can be connected with the tire.

The memory storage medium can be a transponder or a bar code. The use of a memory storage medium has the advantage that the characteristics typical of the tire can be determined by the manufacturer of the tire and, upon a change of the wheel, slightly modified data can easily be assigned to the vehicle.

The dimension of the tire can be recognized through the situation of the maximum amplitude values. The knowledge that the side wall of a tire is generally lower for large rim diameters than for tires with small diameters can thereby be utilized. The lower the side wall is, the higher the natural frequency is.

A calibration dependent on the speed of the motor vehicle is preferably carried out on the moving motor vehicle with the help of an initialization device.

For the determination of the standardized amplitude, the conversion from the time range to the frequency range is preferably carried out by means of tables.

It has turned out to be advantageous that, before the described processes for the determination of the internal pressure of a vehicle tire, systematic and stochastic interferences should first of all be eliminated from the frequency spectrum in order for these interferences to not lead to erroneous findings in regard to a tire pressure loss.

Two or more of the processes in accordance with the invention described can advantageously be combined with each other. The use of one or more processes in accordance with the invention in a tire pressure monitoring system measuring directly and/or indirectly is also advantageous in regard to the increased safety or redundancy, as the case may be, that is hereby achieved.

Outside influences brought about by the load, the temperature, the humidity, the ambient air pressure, and/or the acceleration of the vehicle can be compensated for in the assessment of the frequency curve in the driving operation. Corresponding sensors must, of course, be provided for this purpose.

If corresponding sensors are provided, then the depth of the profile, the change of which from abrasion brings about a change of the resonance frequency, can also be taken into consideration in the assessment of the frequency curve in the driving operation.

The processes described above can be coupled with an indirect system for the detection of the minimum air pressure.

BRIEF DESCRIPTION OF THE DRAWINGS

The following diagrams clarify the various assessment processes. These depict the following.

DETAILED DESCRIPTION OF THE DRAWINGS

Figure 1:
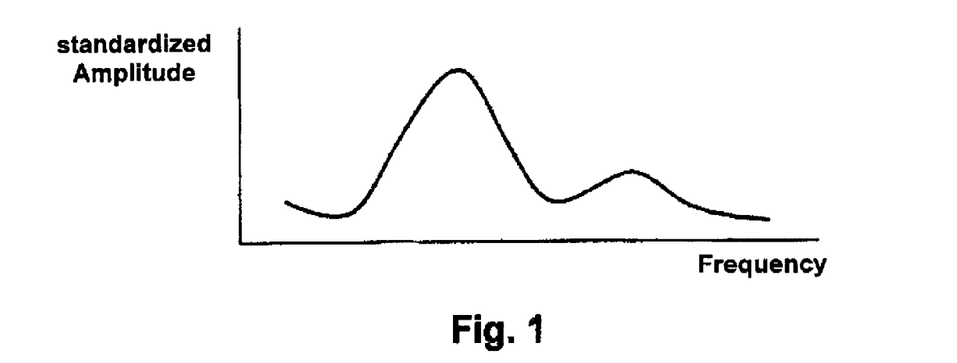
FIG. 1: Representation of principle of the standardized amplitude (plotted logarithmically) over the frequency.

The characteristic vibration behavior of a tire can be determined from the signals of the wheel rotational speed transmitter, such as are used in anti-blocking systems. Here, the representation in accordance with FIG. 1 depicts the dependence of the standardized amplitude plotted logarithmically over the frequency. The determination of this curve is explained in very detailed form in U.S. Pat. No. 6,385,553, or in DE 101 57 885, so that no additional explanations have to be made about this.

Figure 2:
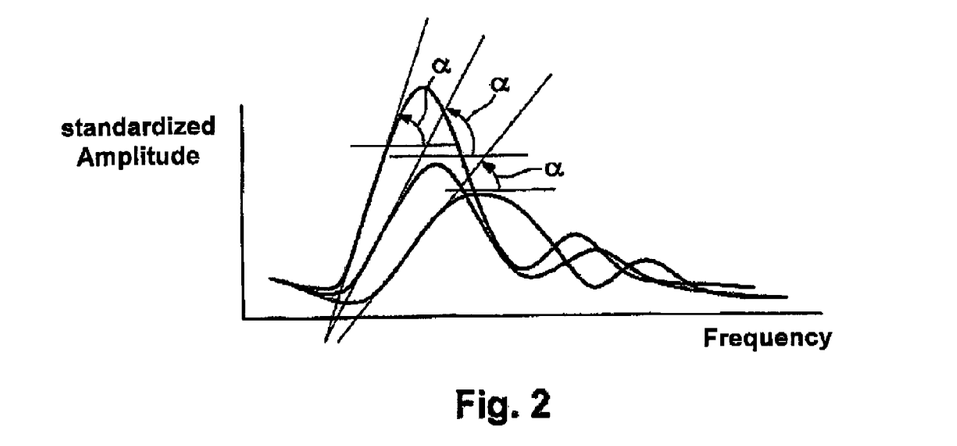
FIG. 2: Representation of principle of the gradients changing with dropping air pressure.

With dropping internal tire pressure, the quantities of the damping and rigidity of the tire that are dependent on the pressure bring about a relative amplification of the stimulation of the rim at frequencies below the resonance frequency, and a reduction at frequencies above the resonance frequency. The gradients of the amplification below and above the resonance can be determined after the assessment of the wheel rotational speed signals (such as by means of Fourier transformations through integral numbers of rotations at approximately equal speed, for example) and can be used at theoretical internal pressure, by means of a comparison with the theoretical condition of the tire previously calibrated, as a dimension for a possible minimum air pressure. The gradients Actual and Theoretical are placed in a ratio to each other. If this value lies outside tolerance values set over a defined period of time, then a warning of excessively low tire pressure occurs.

A representative amplitude spectrum must be used in the determination of the resonance frequency. Stationary driving conditions need to be determined for this. An adequate resolution of the frequency must also be ensured. A large number of averagings of the values determined provide a good estimate of the air pressure, consider the weighting of road ratios (poor surface, level surface), and allow a standardization of the vibration identity.

Figure 3:
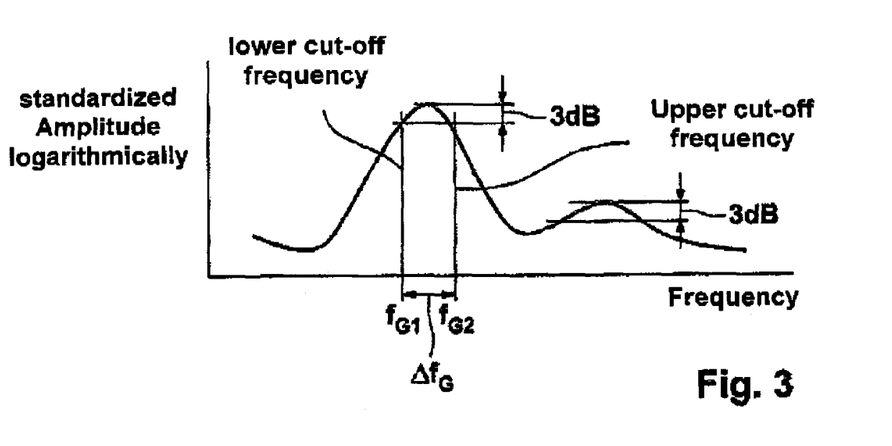
FIG. 3: Representation of the 3 dB cut-off frequencies at various maxima of the amplitude.

FIG. 3 depicts the 3 dB cut-off frequencies, which are determined from the amplitude maximum. The difference frequency $f_G$ is determined from the difference of the upper cut-off frequency $f_{G2}$ and the lower cut-off frequency $f_{G1}$. Upon dropping air pressure, the difference frequency is reduced, since the standardized amplitude increases, which leads in turn to a compression of the frequency curve (compare FIG. 2). The smaller the difference frequency is, the lower the air pressure is. If the difference frequency drops below a preset value for a defined span of time, then a signal is produced which indicates the minimum air pressure.

Figure 4:
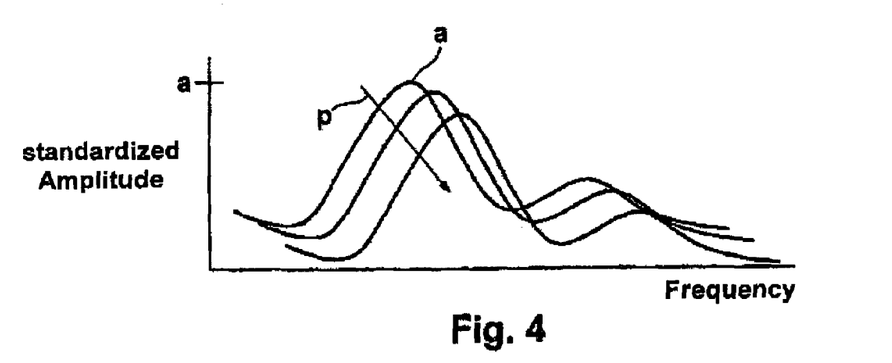
FIG. 4: Representation of principle of the increasing amplitude maximum upon dropping internal tire pressure.
Figure 5:
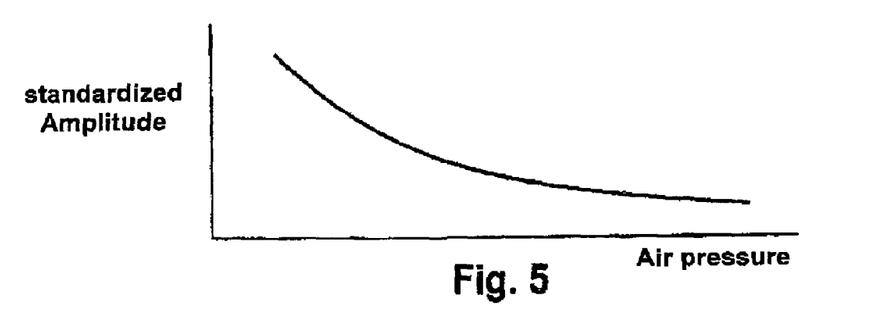
FIG. 5: The dependence, in principle, of the standardized amplitude on the air pressure of the tire.

It can be inferred from FIG. 4 that the amplitude shifts into the direction of lower frequencies if the internal tire pressure drops. At the same time, the maximum value of the amplitude is increased. The maximum is determined and compared with the theoretical value. If the maximum value currently determined increases above a preset value, then the signal indicating the minimum pressure is produced.

The location of the cut-off frequencies $f_{G1}$, $f_{G2}$, the quantity of the gradients $_{Theoretical,\ Actual}$, and the value of the maximum amplitudes $a_{Theoretical}$, $a_{Actual}$ are, in addition to the air pressure, dependent upon a multiplicity of additional parameters, such as the type of tire and the abrasion condition, for example. The tire pressure monitoring system working with the proposed processes must therefore be calibrated. A set of calibration parameters is thereby recorded. An initialization device must be activated in order to trigger the initialization. It is thereby reported to the system that all of the tires have been correctly filled. Internal calibration data sets are preferably recorded for different speed- and wheel momentum ranges. If driving is carried out for the first time after the activation of the initialization by means of a speed range, then the set of calibration parameters is always determined for this range.

Outside influences which influence the location of the values stated above can be compensated for if suitable measured values are available in the vehicle. These can be determined by means of corresponding sensors. The wheel load can be determined from the level regulating system. The temperature can be taken into consideration through the external temperature sensor, in connection with a temperature model for tires, if necessary. Accelerations and decelerations of the vehicle can be determined by means of the ABS sensors or the brake light switch. The ambient air pressure can be taken into consideration from the engine control unit. The depth of the profile can be determined through the determination of the extent of rolling (ground covered/wheel rotational speed).

Figure 6:
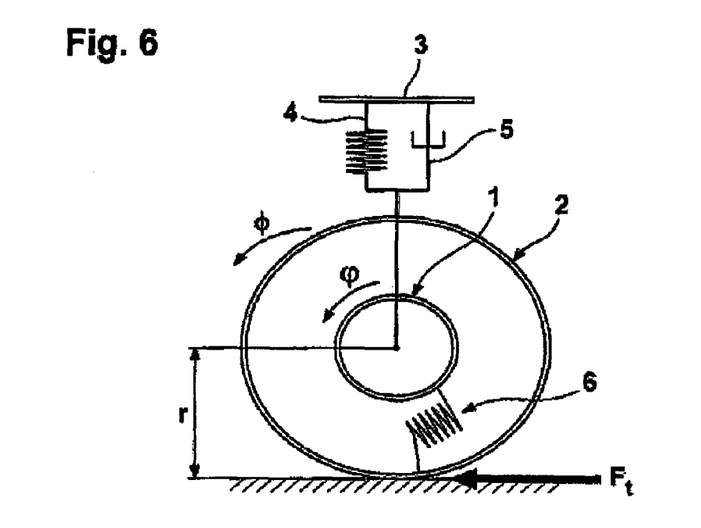
FIG. 6: The model for the description of the wheel vibrations.

FIG. 6 depicts the model for the determination of the tire vibrations. The wheel consists of the rim 1 with the inertia $J_F$ and the belt 2 with the inertia $J_R$. The wheel is connected, by way of the wheel suspension, with the suspension 4, and the damping unit 5 with the construction 3. The damping of the rotational vibrations of the wheel is carried out, by way of the rotational spring/absorber unit 6, with the spring constants $c_s$ and the absorber constants $d_s$. The construction spring 4 has the spring constants $c_a$, and the construction absorber 5 has the absorber constants $d_a$. The belt 1 is moved with angular velocity, and the rim 1 is moved with angular velocity. The wheel receives the stimulation for vibration from the road with the force $F_r$.

If only the wheel alone is considered, and if the connection of the wheel to the construction 3 by way of the suspension 4 and the damping unit 5 is disregarded, then the rotation of the tires 1 and the rim 2 can be described, in accordance with this model, by means of the following differential equations:

The rotational rigidity $c_s$ and the rotational damping $d_s$ are dependent, among other points, on both the air pressure p and the type of wheel suspension, as well as the driving speed. The dynamic rolling radius r is, in this formulation, replaced by a constant tire radius R.

The differential equation system stated above can be advantageously and rapidly solved with a Laplace transformation in the frequency range. First of all, the differential equation system is rewritten into a first-order system:

Once rewritten, this yields the following differential equation system:

This differential equation system is now subjected to a Laplace transformation. In this, the following is valid: with the complex variable s.

As the result of that, a linear equation system is obtained from the differential equation system:

A★=

Let:

A=

If the following is now assumed:

$$s = i\omega$$

Figure 8A:
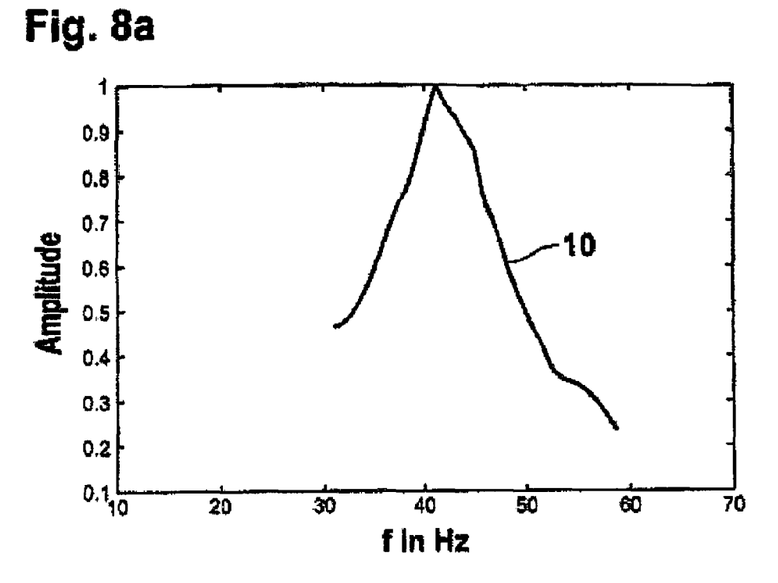
FIGS. 8 to 10: Frequency curves.
Figure 8B:
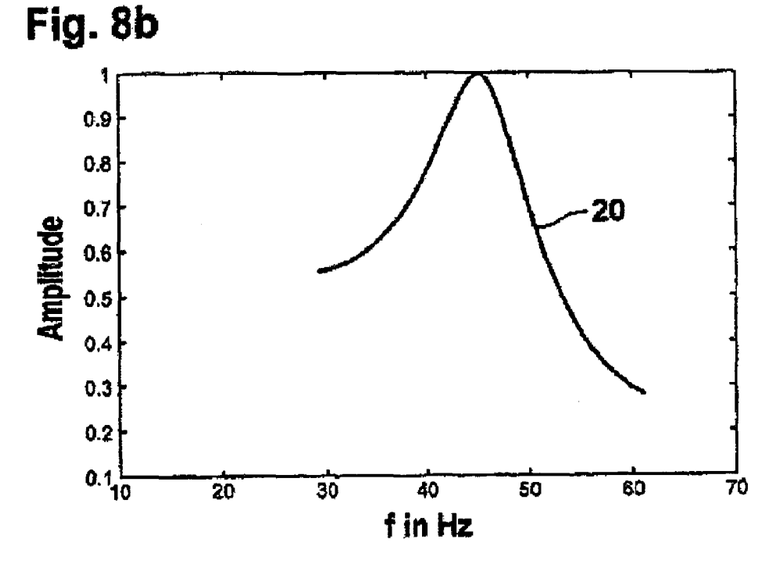

($i^2$=−1, ω=cyclical frequency); and if it is considered that:

then the frequency response is obtained directly, without having to state $F_r$:

By means of the tire model, it is possible to determine the natural frequency quickly and accurately, without tedious measurements. The ABS signal provides the frequency spectrum of the rotary oscillation of the rim, as it was measured. One example of a frequency spectrum 10 measured is depicted in FIG. 8a. A second frequency spectrum 20 in accordance with FIG. 8b is obtained by applying a Dirac impulse or a tangential stimulation $F_t$, to the model, in accordance with which the frequency spectrum 20 of the model is computed in dependence on the model parameters.

Figure 9:
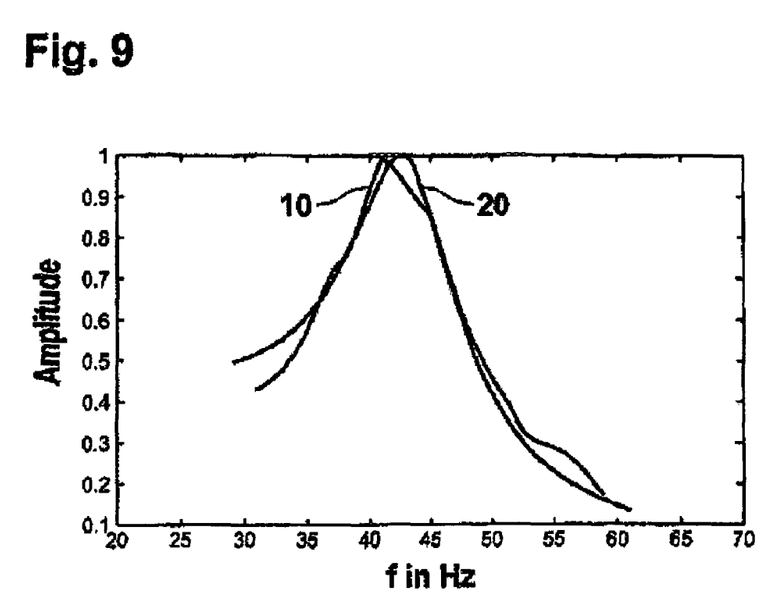

Through the variation of the parameters in regard to the rotational rigidity $c_s$ and the rotational damping $d_s$, the model can be calibrated to the measured spectrum for a specific speed and a specific air pressure of the tire, such as, for example, by determining the minimum of the total of the squares between the model and the spectrum measured, which is depicted in FIG. 9.

Figure 10:
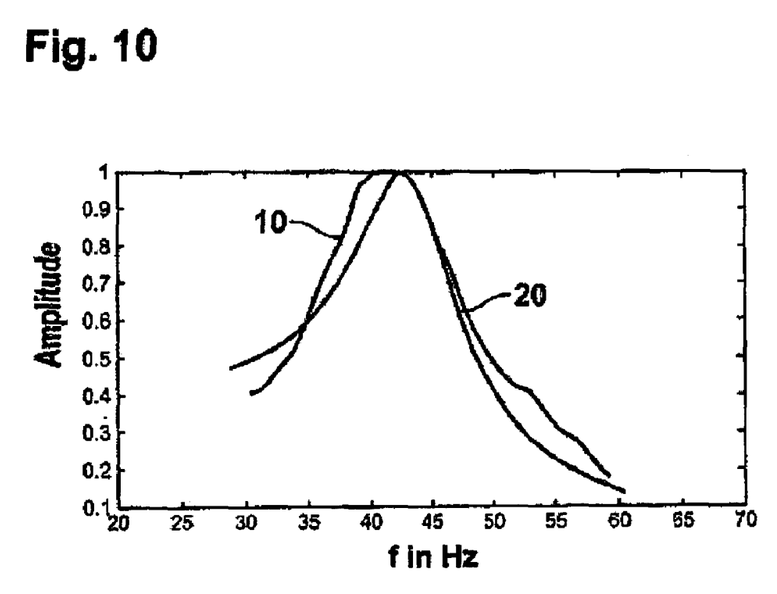

The tire is identified by means of the set parameters $c_s$ for die rotational rigidity of the tire and $d_s$ for the rotational damping of the tire, and the tire model can be used in order to determine the actual air pressure of the tire. This is brought about through the fact that the frequency spectrum measured is adjusted to the model frequency spectrum through variations of the air pressure inside the model. An adjusted frequency curve is depicted in FIG. 10. As soon as a sufficiently accurate agreement is achieved between the measured frequency spectrum 10 and the model frequency spectrum 20, the air pressure of the tire that is actually present is determined and can be reported by way of a display. In an alternative manner, a warning can be issued in the event of a falling short or an exceeding of the boundary value.

In an alternate manner to the explicit solution of the differential equation system above by means of Laplace transformation, empirical solution functions that contain the adjustable parameter can be used. For example, a typical spectrum can be described for the specific vehicle by means of the following model equation for the amplitude:

whereby the constants a, b, e, and n must be adjusted to the vehicle, and n must lie between 0.3 and 0.9. The result of this determination can be seen in FIG. 7.

Figure 7:
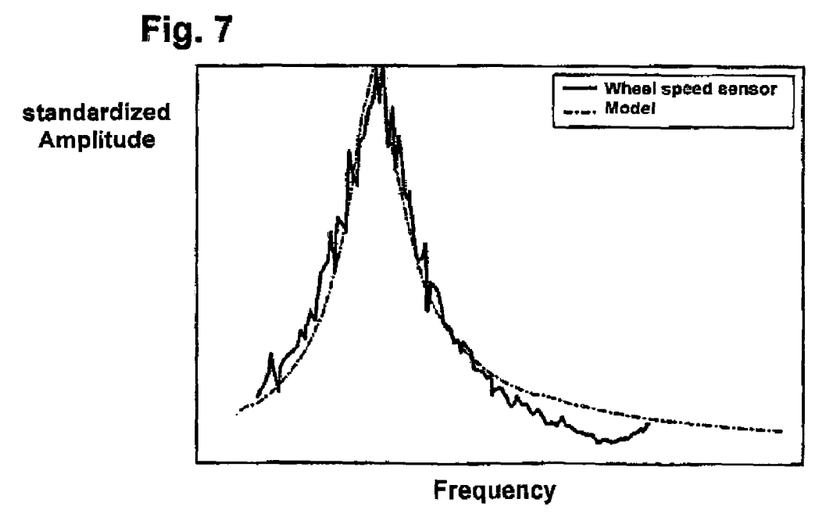
FIG. 7: The superimposed frequency curves in accordance with the model and the values from the wheel rotational speed transmitters.

The solid line represents the standardized amplitude spectrum of the wheel rotational speed transmitter, while the dotted line represents the result of the model. The air pressure of the tire p is determined from the values for rigidity and damping $c_s$, $d_s$ that have been determined, through adjustment of the model curves computed on the measured curves as function $p=f(c_s, d_s)$.

The elimination of systematic and stochastic interferences in the frequency spectrum in the foreground of the processes described for the determination of the internal pressure of a vehicle tire has proven to be useful in order for these interferences to not lead to erroneous findings in regard to a loss of tire pressure.

The following types of systematic interferences must be eliminated from the spectrum:
1. Interferences accumulating synchronously with the rotary motion of the wheel, such as the pole pitch error of the encoder for the measurement of the wheel speed, general tire and rim irregularities or even mounting tolerances, for example.
2. Interferences due to vibrations in the drive branch which only appear on the driven wheels.
3. Interferences due to mono-frequent stimulations of the road.

For the elimination of these interferences, the noise frequency is first of all identified and the amplitude corresponding to this frequency is then replaced in the spectrum by the average of the amplitudes of the adjacent frequencies, for example. It is thereby recommended to also eliminate higher orders of these noise frequencies. Upon an integral multiple of the engine base frequency, as well as, at times, upon an integral multiple of half the engine base frequency, noise frequencies of the engine, for example, have been shown to be dependent on the construction type of the engine.

The following processes are used for the identification of the different systematic noise frequencies:
On (1): Noise frequencies are the wheel rotational frequency and its integral multiple in the relevant frequency range.
On (2): Noise frequency is the engine rotational frequency, computed from the engine rotational speed of the vehicle data bus, such as the CAN, for example, as well as the integral multiple of the engine rotational frequency and half the engine rotational frequency. If the information on the engine type, for example, is located on the vehicle data bus, or if this can not be derived from the information present there, then it is recommended to only eliminate the orders that are relevant for the specific engine type.

Gear rotational frequencies, computed from the wheel rotational speed (if applicable: also the engine rotational speed) and the transmission ratios/numbers of teeth.

On (3): Noise frequencies that are stimulated by the road can be detected on the front- and rear wheel of the same vehicle side. These can be identified through a comparison of the spectra of the front- and rear wheel for signals determined at the same time.

The result of this process step is an unfiltered frequency spectrum that is cleaned up in regard to the systematic interferences, such as in the form of the spectral power density, for example.

It should be noted that it is, in essence, considerably easier to eliminate these systematic interferences in the frequency range than in the time range.

For the elimination of stochastic interferences, the spectra are averaged over a longer period of time or a filtered frequency spectrum is computed, as the case may be. Specific quality requirements are hereby placed on an individual unfiltered spectrum, such as the minimum energy content (since natural vibrations are hardly expressed on very smooth roads), distinctiveness of the peak, etc, for example.

For the event that these requirements are not fulfilled, this spectrum is not used for the computation of the average or filtered spectrum, as the case may be.

The invention claimed is:
1. A method for determining an internal pressure of a vehicle tire during driving comprising:
analyzing characteristic vibration behavior of at least one wheel of the motor vehicle, wherein an amplitude maxima of a resonance frequency is observed from a determined vibration spectrum;
determining and recording theoretical resonance frequency of at least one wheel with a preset theoretical pressure;
determining and storing in a memory theoretical gradients of a frequency curve above and below the resonance frequency;
forming a theoretical ratio from the gradients;
continuously determining an actual resonance frequency of the wheel during a driving operation;
continuously determining actual gradients of the frequency curve above and below the operational resonance frequency;
forming an actual ratio from the actual gradients;

comparing the theoretical ratio and the actual ratio to determine a divergence of the actual ratio from the theoretical ratio; and producing a signal if the divergence from the actual ratio to the theoretical ratio exceeds a defined value.

2. The method according to claim 1, wherein the signal is only produced if the divergence exceeds the defined value over a set period of time.

3. The method according to claim 1, wherein the theoretical gradients below and above the resonance are determined externally for one specific type of tire and are stored in memory on a memory storage medium that can be connected with the tire.

4. The method according to claim 1, wherein outside influences brought about by at least one of a load, a temperature, a humidity, ambient air pressure, or an acceleration of the vehicle can be compensated for in the assessment of the frequency curve in the driving operation.

5. The method according to claim 1, wherein the depth of the profile of the tire is taken into consideration in the assessment of the frequency curve in the driving operation.

6. The method according to claim 1, wherein a calibration dependent on the speed of the motor vehicle is carried out on the moving motor vehicle with the help of an initialization device.

7. The method according to claim 1, wherein a conversion from a time range to a frequency range is carried out by means of tables.

8. The method according to claim 1, further comprising coupling with an indirect system in order to detect the minimum air pressure.

9. A method for determining an internal pressure of a vehicle tire during driving comprising:

analyzing characteristic vibration behavior of at least one wheel of the motor vehicle, wherein an amplitude maxima of a resonance frequency is observed from a determined vibration spectrum;

determining and recording a theoretical resonance frequency of the wheel with a preset theoretical pressure;

determining theoretical cut-off frequency of the maxima;

forming and storing in a memory a theoretical difference frequency from a higher cut-off frequency and a lower cut-off frequency;

determining an actual resonance frequency of the wheel during a driving operation;

determining an actual cut-off frequency of the maxima during the driving operation;

forming an actual difference frequency from the higher actual cut-off frequency and the lower actual cut-off frequency;

comparing the theoretical difference frequency and the actual difference frequency to determine a divergence of the actual difference frequency from the theoretical difference frequency; and producing a signal if the divergence from the actual difference frequency and the theoretical difference frequency exceeds a defined value.

10. The method according to claim 9, wherein the theoretical cut-off frequencies of the maxima are determined externally for one specific type of tire and are stored in memory on a memory storage medium that can be connected with the tire.

11. The method according to claim 9, wherein outside influences brought about by at least one of a load, a temperature, a humidity, ambient air pressure, or an acceleration of the vehicle can be compensated for in the assessment of the frequency curve in the driving operation.

12. The method according to claim 9, wherein the depth of the profile of the tire is taken into consideration in the assessment of the frequency curve in the driving operation.

13. The method according to claim 9, wherein a calibration dependent on the speed of the motor vehicle is carried out on the moving motor vehicle with the help of an initialization device.

14. The method according to claim 9, wherein a conversion from a time range to a frequency range is carried out by means of tables.

15. The method according to claim 9, further comprising coupling with an indirect system in order to detect the minimum air pressure.

16. A method for determining an internal pressure of a vehicle tire during driving comprising: analyzing characteristic vibration behavior of at least one wheel of the motor vehicle, wherein an amplitude maxima of a resonance frequency is observed from a determined vibration spectrum; determining and recording a theoretical resonance frequency of the wheel with a preset theoretical pressure; determining and storing in a memory of a maximum theoretical amplitude value at the theoretical pressure of the tire; determining an actual resonance frequency of the wheel during a driving operation; determining an actual maximum amplitude value during the driving operation; comparing the theoretical maximum amplitude and the actual maximum amplitude to determine a divergence of the actual maximum amplitude from the theoretical maximum amplitude; producing a signal if the divergence from the actual maximum amplitude and the theoretical maximum amplitude exceeds a defined value; and wherein the depth of the profile of the tire is taken into consideration in the assessment of the frequency curve in the driving operation.

17. The method according to claim 16, wherein the theoretical maximum amplitude value is determined externally for one specific type of tire and is stored in memory on a memory storage medium that can be connected with the tire.

18. The method according to claim 16, wherein outside influences brought about by at least one of a load, a temperature, a humidity, ambient air pressure, or an acceleration of the vehicle can be compensated for in the assessment of the frequency curve in the driving operation.

19. The method according to claim 16, wherein a calibration dependent on the speed of the motor vehicle is carried out on the moving motor vehicle with the help of an initialization device.

20. The method according to claim 16, wherein a conversion from a time range to a frequency range is carried out by means of tables.

21. The method according to claim 16, further comprising coupling with an indirect system in order to detect the minimum air pressure.

22. A method for determining an internal pressure of a vehicle tire during driving comprising:

analyzing characteristic vibration behavior of at least one wheel of the motor vehicle, wherein an amplitude maxima of a resonance frequency is observed from a determined vibration spectrum;

determining and recording a theoretical frequency spectrum of the wheel with a preset theoretical pressure;

determining a theoretical approximate position of the resonance frequency;

transforming differential equations that describe the vibration behavior of the wheel;
selecting a theoretical range around the approximate position of the resonance frequency;
correlating the selected range with the transformed differential equations;
computing a theoretical rotational rigidity and a theoretical rotational damping;
determining an actual frequency spectrum of the wheel in during a driving operation and determining an actual approximate position of the resonance frequency;
selecting an actual range around the actual approximate position of the resonance frequency;
correlating the actual selected range of the determined resonance frequency with the transformed differential equations in order to determine an actual rotational rigidity and an actual rotational damping;
comparing the theoretical rotational rigidity and the actual rotational rigidity to determine a first difference;
comparing the theoretical damping and the actual damping to determine a second difference; and
producing a signal, if at least one of the differences exceeds a defined value.

23. A method for determining an internal pressure of a vehicle tire during driving comprising:
analyzing characteristic vibration behavior of at least one wheel of the motor vehicle, wherein an amplitude maxima of a resonance frequency is observed from a determined vibration spectrum;
determining theoretical internal tire pressure in a theoretical condition in dependence on a rotational rigidity and rotational damping, wherein parameters that take into account tires that are typical for the vehicle are referred to;
determining actual internal tire pressure in an actual condition in dependence on the rotational rigidity and the rotational damping;
comparing the theoretical internal tire pressure and the actual internal tire pressure to determine a difference the theoretical internal tire pressure and the actual internal tire pressure; and
producting a signal if the difference exceeds a defined value.

* * * * *